April 29, 1969 W. C. MOORE ET AL 3,441,340
UNITARY LIGHT PROJECTING ASSEMBLY FOR DIAGNOSTIC INSTRUMENTS
Filed Sept. 28, 1965 Sheet 1 of 2
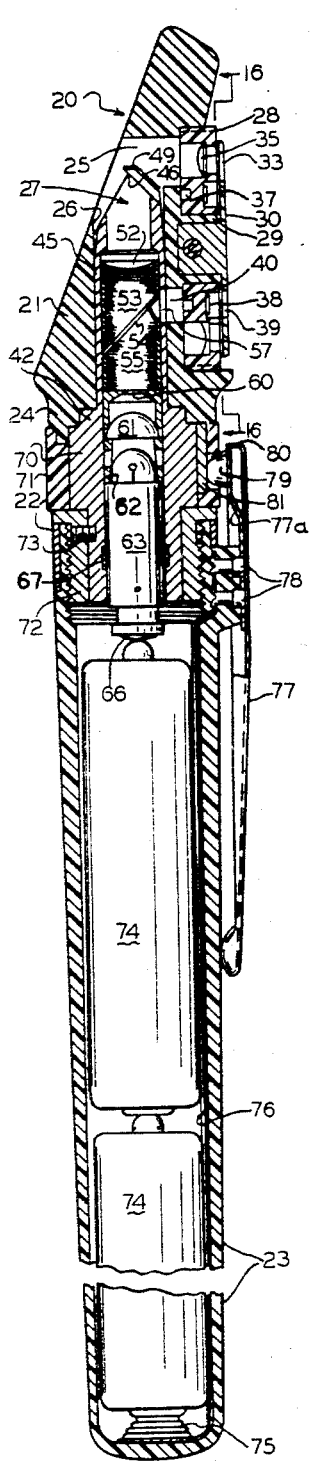
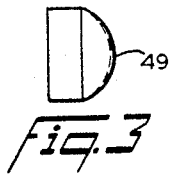
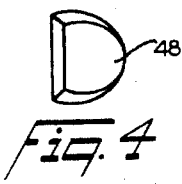
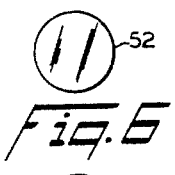
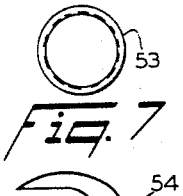
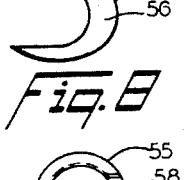
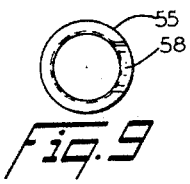
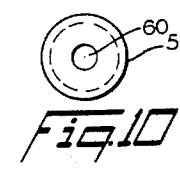
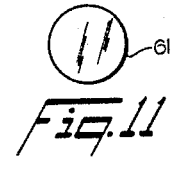
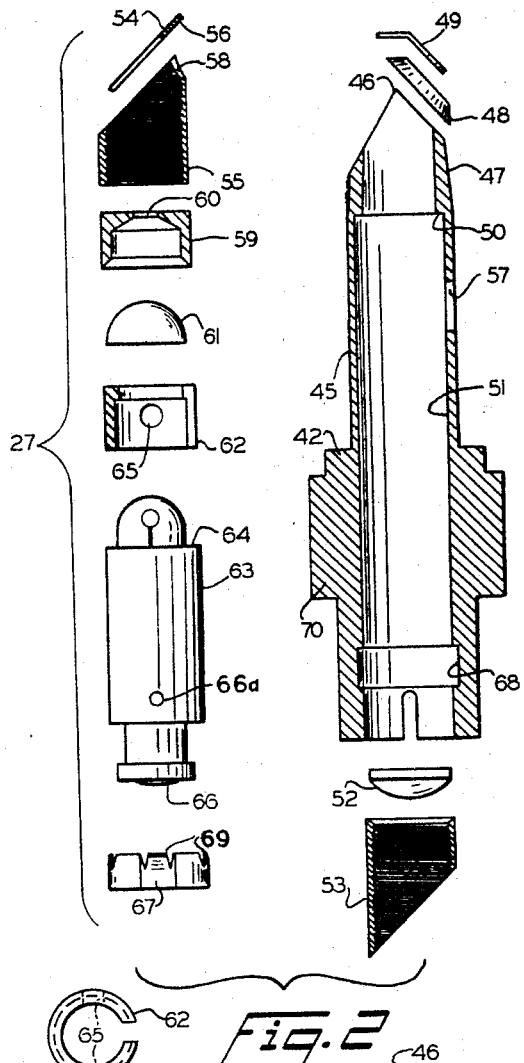
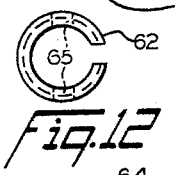
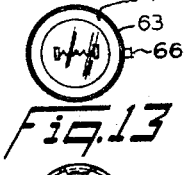
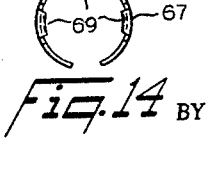
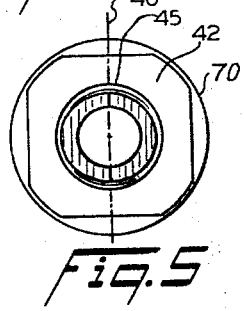
INVENTORS.
WILLIAM C. MOORE
JOHN D. CONNORS
BY Bruns and Jenney
Att'ys.

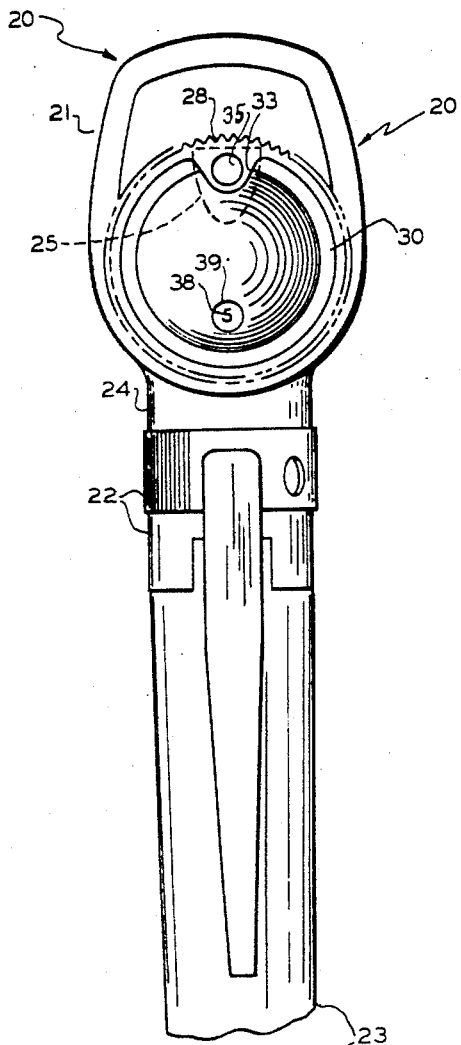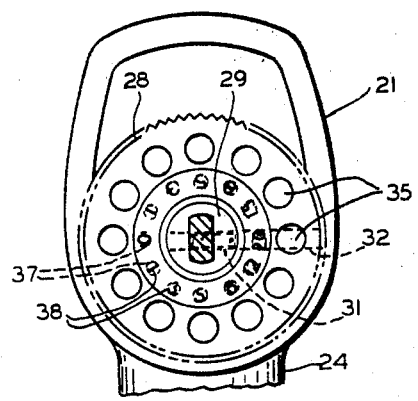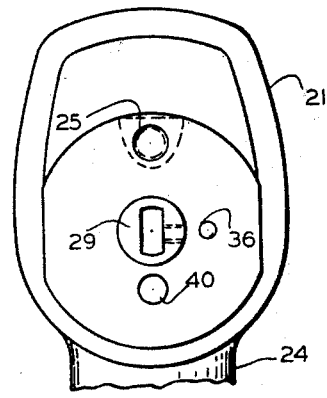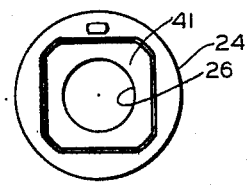

United States Patent Office 3,441,340
Patented Apr. 29, 1969

1

3,441,340
UNITARY LIGHT PROJECTING ASSEMBLY FOR
DIAGNOSTIC INSTRUMENTS
William C. Moore, Skaneateles, and John D. Connors,
Auburn, N.Y., assignors to Welch Allyn, Inc., Skaneateles Falls, N.Y., a corporation of New York
Filed Sept. 28, 1965, Ser. No. 490,884
Int. Cl. A61b 3/12
U.S. Cl. 351—16                                    5 Claims

ABSTRACT OF THE DISCLOSURE

An ophthalmoscope has a plastic head with an axial passage and an intersecting transverse passage. A metal tube in the axial passage has an internal annular flange forming a shoulder adjacent the transverse passage. An objective lens, tubular spacer means, an apertured spacer, a condensing lens, a collar, and a lamp are telescopically and successively fitted within the tube, the lamp being frictionally engaged with the tube. A mirror in the passage intersection is secured to the tube end at an angle for reflecting light from the lamp out through the transverse passage, the tube bearing the entire light projection system.

---

This invention relates to diagnostic instruments and has particular reference to a unitary optical system for projecting light from an ophthalmoscope or like instrument.

The pocket size diagnostic instruments which employ a lamp and lenses for projecting light upon a particular body area for examination must be small in size and light in weight. A small lamp, powered by batteries, a condensing lens, an objective lens, a constricted orifice, and means for directing light in a particular direction, such as a mirror, are usually employed in the light projection system. Each element in the system must be precisely aligned and located with respect to the other elements and oriented in the instrument for proper functioning.

Molded plastic materials are particularly suited for the manufacture of light weight instruments but such materials usually change shape upon coming out of the mold or being subjected to changes in temperature and are not suited for the precise alignment and orientation of parts required in such optical systems.

One of the principal objects of the present invention, accordingly, is to provide a self-contained and unitary optical system for such instruments which may be used in conjunction with body parts of molded plastic materials and in which the elements of the system are so precisely oriented and aligned as to compare favorably in operation with larger instruments in which the light projection system elements are located in precisely machined seats and other locating means in a metal body portion of the instrument.

Another important object is to provide an efficient ophthalmoscope which is small and light in weight so as to be easily portable and pocket-sized.

Still another important object is to provide a unitary light projecting optical system which may be assembled and separately tested prior to being assembled in the completed instrument.

A further object is to provide a unitary light projection system in which miniature elements are used but in which the alignment and orientation of the parts are so precise as to compare favorably in result with larger systems.

A still further object is to provide such a miniature light projection system which may be economically made and which is sturdy and trouble free.

Other objects and advantages will become apparent from the following description in conjunction with the attached drawings, in which:

FIGURE 1 is a longitudinal sectional view of an ophthalmoscope according to the invention;
FIGURE 2 is an enlarged, exploded view of the unitary optical system parts thereof;
FIGURES 3–14, inclusive, are plan views, respectively, of the elements of the system shown in FIGURE 2, in the following order: mirror hood, mirror, optical tube, objective lens, leading diffusion tube, reflector plate, trailing diffusion tube, aperture cap, condensing lens, retainer collar, lamp, and lamp collar;
FIGURE 15 is a side elevational view of the ophthalmoscope of FIGURE 1;
FIGURE 16 is a fragmentary sectional view on the line 16–16 of FIGURE 1;
FIGURE 17 is a fragmentary elevational view of the head of FIGURE 15; and
FIGURE 18 is a bottom plan view of the boss portion of the head of FIGURE 15.

In the drawings an ophthalmoscope 20 is shown having a head portion 21 and a body portion 22, including a battery containing handle 23.

As best seen in FIGURE 1, the head 21 has a pendant annular boss or neck 24 by which it is joined to the body, a transverse viewing passage 25, and an axially extending passage 26 in which is secured the unitary optical system 27, hereinafter more fully described.

The distal side of the head has a single opening, formed by viewing passage 25, and on the proximal side a circular viewing lens carrier 28 formed of translucent plastic material and having a serrated edge is rotatably mounted about a central circular boss 29. The boss 29, FIGURE 17, has an elongated hole therein in which is secured a similarly shaped hub of a cover plate 30, FIGURE 15, by the screw 31 (FIGURE 16), an access hole to the screw being provided at 32 in the carrier 28.

A viewing opening 33, FIGURE 15, in plate 30, provides an aperture through which the viewer can look through the viewing passage 25, the lens carrier being provided with a plurality of lenses 35, of different focal lengths, which can be selectively employed in the viewing passage 25 by turning carrier 28, as is usual in ophthalmoscopes.

A spring-pressed ball detent 36, seen in FIGURE 17, is provided in a well in the head 21 so as to be selectably engageable in plurality of suitable recesses 37 in the carrier 28 diametrically aligned with the lenses 35, and the opposite surface of carrier 28 is provided with suitable numerical indicia 38, opposite recesses 37, identifying the individual lenses. An indicia orifice 39 is provided in the cover plate 30, diametrically opposite the viewing hole 33, for registration of indicia 38 therein, as illustrated in FIGURE 15.

An indicia illuminating orifice 40 (FIGURES 1 and 17) is provided in the head 21 aligned with the orifice 39 and registerable with the individual indicia 38 as the lens carrier 28 is turned. The orifice 40 communicates with the passage 26 in the head for a purpose which will appear in connection with the light projection optical system 27, which will now be described.

The passage 26 extends axially of head 21 from the viewing passage 25 through the neck 24. The neck has a substantially rectangular recess 41 therein, centered about the passage 26, and in this recess a flange 42 (FIGURE 5), of similar configuration, formed on the optical tube 45, is seated.

Tube 45 extends through the passage 26 and is secured therein, as by a suitable adhesive. The upper end of the tube is beveled on either side of an end line 46 (FIGURE 5) across the tube. The end line passes through the tube axis and the end portion of the tube is tapered at 47 as shown in FIGURE 2. One side of the tapered end is beveled at an angle of substantially 45 degrees from the tube axis and a mirror 48 conforming generally in outline to this beveled side of the tube end is secured thereon by an appropriate adhesive. Mirror 48 is aluminized, or otherwise rendered reflective, on its front or first surface and has a beveled edge, as shown.

The mirror is substantially larger than the beveled side of the tube end, projecting forward beyond end line 46 a substantial distance of the order of ⅛₄ inch. The mirror is rounded in outline, extending slightly beyond the end of the tube sides but, due to the tapered end 47 of the tube, it does not extend to the walls of the passage 26 in the head.

A mirror hood 49, anodized or otherwise rendered black, is secured, as by adhesive, over the top and back of the mirror, as shown in FIGURE 1. As shown in FIGURE 3, the top of the hood is rectangular and the portion over the back of the mirror is semicircular and bent to conform to the surface of the back of the mirror.

The length of the tube 45, from its seated flange 42 to the line 46, is such that the attached mirror 48 and hood 49 lie in viewing passage 26 but extend up to only the lower portion of whichever viewing lens is in position on the carrier 28 aligned with opening 33.

The end of tube 45 on the other side of line 46 is beveled at an angle of about 30 degrees to the tube axis, providing an opening in that side of the tube for the emerging light reflected from the mirror.

The tapered end 47 of the tube has a constricted axial passage therethrough providing an annular shoulder 50 (FIGURE 2), at the end of the bore 51 extending axially of the tube, which shoulder defines a reference plane transversely of the tube with respect to which the lens and spacer elements of the light projection system are oriented. These elements, as hereinafter described, are all telescopically inserted in the bore 51 of the tube.

The plano-convex objective lens 52 is seated in the tube with its flat side against the shoulder 50. Next, the leading tubular diffusion chamber housing 53, the reflection plate 54 and the trailing chamber housing 55 are inserted, in that order. The leading housing 53 has a chamfered leading edge seating smoothly against the marginal portion of the curved surface of lens 52, and the trailing edge of the housing has a mitred end providing a shoulder at 45 degrees to the axis of tube 45 against which the reflection plate 54 is seated.

Since the plate 54 is disposed at an angle to the tube it is somewhat semielliptical or horseshoe-shaped and provides a passage at its center through which light may pass from one lens to the other. Its arcuate or closed end 56 is disposed in the tube adjacent the orifice 40 in the head and an aligned hole 57 in the tube.

The leading end of the trailing housing 55 is reversely mitred at 45 degrees so as to seat squarely against the plate 54, and the housing is provided with a semicircular hole 58 therethrough aligned with hole 57 in the tube. Both leading and trailing housings are provided with an uneven surface, by threading, and painted or otherwise rendered black to prevent reflection, as is usual with diffusion chambers.

The trailing edge of the trailing housing 55 is flat, providing an annular seat for the flat top of the aperture cap 59, the next element telescoped within the tube. The top of the cap has a constricted central orifice 60 therethrough for centering the spot of light to be projected by the system and the cap is anodized or otherwise rendered black. The lower end edge of the annular cap 59 is chamfered to provide a smooth seat for the curved surface of the plano-convex condensing lens 61 which is the next element.

Retainer collar 62 and the lamp 63 follow behind the lens 61, the lamp 63 being long enough to protrude from the lower end of tube 45. Collar 62 is annular and of the split ring type so as to grip the walls of the tube bore 51 and retain the other elements in the tube should the lamp be subsequently removed. The upper edge of the collar is flat, abutting the flat surface of lens 61, and the lower edge is also flat, abutting the metal shoulder 64 on the lamp. The inner wall of the collar is provided with an annular shoulder near the top so that the lower portion of the collar encircles the glass envelope of the lamp. Holes 65 are provided through the sidewall of the collar to provide a grip portion should it be desired to remove the collar from the tube.

Lamp 63 has one terminal 66 protruding axially from the tube and the other terminal is electrically connected to the metal portion below shoulder 64. This metal portion is provided with a projecting pin or stud 66a which is engaged in an approximate slot in tube 45 (not shown in FIGURE 1), to ensure that the filament of the lamp extends parallel to the straight edge of mirror 48. To ensure a good electrical contact between tube 45 and this latter terminal, and to retain the lamp in the tube while changing batteries, a split ring lamp contact collar 67 is inserted in an appropriate annular groove 68 in the bore 51 of the tube. Collar 67 has a plurality of leaf spring contact tabs 69 bent slightly inwardly as shown, for frictional contact with the metal portion of lamp 63.

The optical tube 45 has a circular external flange 70, below the seating flange 42, and on this flange a switch ring 71 (FIGURE 1) is rotatably mounted. Below the flange 70 a threaded collar 72 is secured around the tube 45 by a set screw 73 and the open end of handle 23 is internally threaded so as to be securable to collar 72 and the attached tube 45.

Batteries 74 are contained in the hollow handle, in series, the positive terminal of the battery series being spring biased against the protruding terminal 66 of the lamp. At the end of handle 23 a coil spring 75 forms an electrical contact with the other terminal of the battery series and biases the batteries against the lamp and all the elements in tube 45 against the shoulder 50.

A metal conducting strip 76, inserted in the handle 23, connects the spring 75 electrically to the metal pocket clip 77, through rivets 78, which secure the clip on the handle 23. Under the upper end of clip 77 a leaf spring 77a extends carrying a metal contact button 79 thereon biased thereby toward portion 70 of the optical tube. By turning the switch ring 71 a hole 80 through the ring may be aligned with button 79 to admit, as shown in FIGURE 1, the button to contact the metal brush member 81 which is carried in a slot in ring 71 in contact with tube 45, as more fully described in our copending application Ser. No. 490,875 filed Sept. 28, 1965, now Patent 3,373,737, issued Mar. 19, 1968.

In assembling the elements of the optical system 27, it will be understood, the mirror 48 and its hood 49 may be attached to the end of optical tube 45, and the successive elements of the system inserted telescopically in order, as follows: lens 52, housing 53, reflection plate 54, housing 55, aperture cap 59, lens 61, retainer 62, collar 67, and lamp 63. The lenses and other elements of the system are all circular, so that if care is taken to align the hole 58 in the trailing diffusion chamber housing with the hole 57 in tube 45, the elements are all self-aligning and will be correctly oriented in the tube when pressure is applied to the projecting end of lamp 63. The optical elements then may be tested to make sure of proper location and orientation of each in the tube, before the tube is assembled in head 21.

The filament of the lamp 63 is centered in the lamp and the lamp centered in the tube 45. The pin 66a is engaged in its cooperating slot in the lower end of tube 45 so that the filament, as best seen in FIGURE 13, extends transverse the tube aligned with the straight edge of mirror 48. Light from the lamp is collected by the lenses 52 and 61 and projected axially of the tube onto the mirror at the center of the straight marginal portion of the mirror and thereby reflected along the viewing passage. The apertured spacer 59 between lenses 52 and 61 defines a spot of light which is "projected" onto the mirror and reflected thereby through the light emitting opening of passage 25.

Once the proper functioning of the elements in tube 45 is ensured, the tube may be secured in head 21 by adhesive or otherwise. The rectangular flange 42 fits within the recess 41 of the neck 24 of the head, and it is only necessary to orient hole 57 in the tube with its aligned hole 40 in the head to ensure the correct placement of tube 45 in the head. Flange 70 rests against the end of neck 24 and ensures that the mirror 48 extends the proper distance into the viewing passage 25.

After the parts of the ophthalmoscope are assembled, operation of the instrument is conventional. Light from the lamp 63 is gathered in a collimated beam, and directed by lens 61, through aperture 60 and axially through the diffusion chamber 53–55 to the objective lens 52 which directs the light to mirror 48. The mirror deflects the light at an angle of 90 degrees through the lower portion of the viewing passage 25. The viewer looks through the opening 33 in the cover plate 30, and through the viewing lens 35 which is uppermost on the lens carrier over the top of hood 49 into the eye of the patient which is illuminated by light from the mirror 48. The proper lens 35 may be chosen by rotation of the lens plate 28.

A novel feature, however, is afforded by the reflecting plate 54. Substantially all of the light in the diffusion chamber passes axially through the chamber between the opposite legs of the reflection plate, but casual light, which is always present in some measure around the edges of such chambers, is collected by the end portion 56 of the plate and reflected out the aligned holes 58, 57 and 40 onto the lens carrier 28 at whatever indicia 38 is aligned with the hole 39 in the cover plate 30. There is a detent recess 37 on the surface of plate 28 opposite each indicia 38 so that the translucent material of plate 28 is thin at this point. The light reflected from the reflecting portion 56 of the reflection plate is therefore sufficient to illuminate the indicia 38 aligned with the hole 39 in the cover plate.

As will be apparent to those familiar with the art, the invention may be embodied in other specific forms without departing from the spirit or essential characteristics thereof. The embodiment disclosed therefore is to be considered in all respects as illustrative rather than restrictive, the scope of the invention being indicated by the appended claims.

What is claimed is:

1. In a diagnostic instrument having a non-metallic head having intersecting transverse and axial passages therein, a unitary light projection system, comprising: a metal optical tube adapted to be inserted and secured in the head axial passage, the tube having a central cylindrical bore and an inwardly projecting annular flange forming an internal annular shoulder at one end of the bore; light source and transmitting means, including an objective lens, tubular spacer means, an apertured spacer, a condensing lens, a collar, and a lamp, telescopically and successively fitted in the bore in that order and with the objective lens against the shoulder, the collar and the lamp being frictionally engaged in the tube for securing the light transmitting means contiguously together and against the shoulder; and a mirror angularly secured to the end of the tube adjacent the shoulder the mirror being adapted to be positioned in the head transverse passage for reflecting light from the tube out the transverse passage; whereby the light projection system may be first assembled with the tube and tested and then secured in the axial passage in the head.

2. The light projection system defined in claim 1 characterized by the lamp having a portion projecting from the tube so as to be adapted to be biased toward the annular shoulder and to be easily grasped for removal.

3. An ophthalmoscope having a handle and a head of molded plastic material, the head having an axially extending passage and an intersecting viewing passage therethrough; a metal optical tube secured in the axial passage, the tube having a central cylindrical bore constricted at the forward end of the tube for forming a rearwardly facing internal annular shoulder; an objective lens, tubular spacer means, an apertured spacer, a condensing lens, a split-ring collar, and a lamp telescopically and successively in that order fitted in the bore; the forward end of the tube being beveled at an acute angle on either side of a line extending across the end of the tube; a mirror within the axial and viewing passages and at an angle to said passages secured to the beveled end of the tube; the tube having an outwardly projecting flange and the head having a cooperating recess at one end for orienting the mirror in the head passages; fastening means secured to the rearward end of the tube for attachment to the handle; and means in the handle for illuminating the lamp and for biasing the lenses, tubular spacer means, collar, and lamp in contiguous relation against the annular shoulder.

4. The ophthalmoscope as defined in claim 3 having a lens dial of translucent material rotatably mounted on the head; the tubular spacer means being separated in two sections having reversely mitred adjacent ends, and a horseshoe-shaped reflector plate interposed between the mitred ends of the two sections at substantially 45 degrees across the optical tube for transversely reflecting casual light radially spaced from the light between lens centers; the tubular spacer means, the optical tube and the head each having holes aligned with the transversely reflected light from the reflector for illuminating a portion of the lens dial.

5. The ophthalmoscope defined in claim 3 characterized by the tube having an internal annular groove, a metal split-ring snap-in ring in the groove and having resilient portions in contact with the lamp for frictionally retaining the lamp in the tube, and the split-ring collar being biased out-of-round for frictionally securing the lenses and tubular spacer means in place when the lamp is removed.

References Cited

UNITED STATES PATENTS

| | | | |
|---|---|---|---|
| 1,066,386 | 7/1913 | De Zeng | 351—6 |
| 1,763,482 | 6/1930 | Scheppmann | 250—219 X |
| 1,815,866 | 7/1931 | Reese | 351—12 |
| 2,269,962 | 1/1942 | Wappler | 351—12 X |
| 2,370,514 | 2/1945 | Arnesen | 351—12 |

FOREIGN PATENTS 488,267   7/1938   Great Britain.

DAVID SCHONBERG, *Primary Examiner.*

PAUL A. SACHER, *Assistant Examiner.*

U.S. Cl. X.R.

351—6, 12